June 26, 1945. K. C. CLARK 2,378,911
SIMPLIFIED AUXILIARY WHEEL AND TIRE CARRIER
Filed Feb. 24, 1943 2 Sheets-Sheet 1

INVENTOR.
KENNETH C. CLARK
BY
ATTORNEYS

June 26, 1945.  K. C. CLARK  2,378,911
SIMPLIFIED AUXILIARY WHEEL AND TIRE CARRIER
Filed Feb. 24, 1943  2 Sheets-Sheet 2
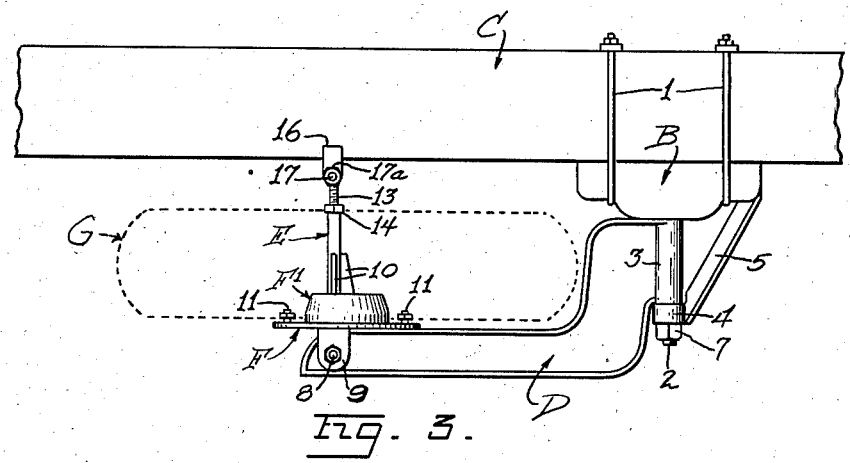
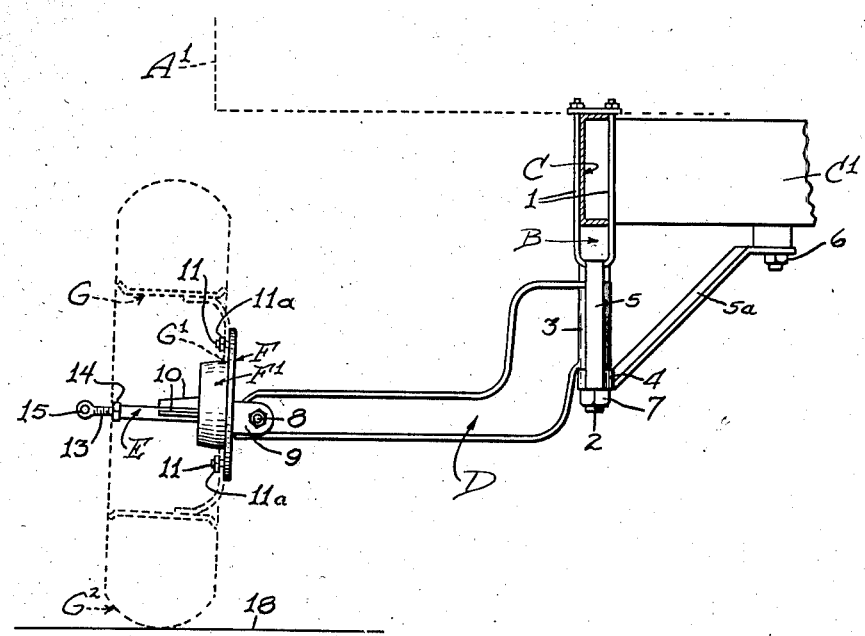
INVENTOR.
KENNETH C. CLARK
BY
ATTORNEYS Patented June 26, 1945

2,378,911

UNITED STATES PATENT OFFICE 2,378,911

SIMPLIFIED AUXILIARY WHEEL AND TIRE CARRIER

Kenneth C. Clark, Watsonville, Calif.

Application February 24, 1943, Serial No. 476,982

9 Claims. (Cl. 224—29)

The present invention relates to improvements in a simplified auxiliary wheel and tire carrier, and it consists of the combinations, constructions and arrangements hereinafter described and claimed.

An object of my invention is to provide a simplified auxiliary wheel and tire carrier which is an improvement over the auxiliary wheel and tire carrier shown in my copending application, Serial No. 416,507, filed October 25, 1941. In the copending case I show an auxiliary wheel carrying arm that is pivotally supported under the chassis of a truck or trailer and carries a hinged platform for receiving and supporting an auxiliary wheel and tire. In the copending case the arm is locked in both the extended and retracted positions and the hinged platform is secured in a horizontal position. It is necessary in my copending device for the operator to grip the wheel after it has been mounted on the platform and tilt the wheel and platform into a horizontal position. After the platform is in a horizontal position, the stud receiving openings on the wheel are aligned with the studs on the platform by rotating the wheel until alignment takes place after which nuts are threaded onto the studs to secure the wheel in place. The central guide for the wheel has an auxiliary support that receives a bolt for securing the free end of the arm to the chassis.

In the present invention I do away with the necessity of the operator having to lift the wheel with his hands and instead make use of a lever which is pivotally secured to the auxiliary arm and which may be manually swung for tilting the platform into a horizontal position after the wheel has been secured to the platform. The platform is secured to the lever off center so that the weight of the wheel on the platform will tend to hold it in a horizontal position. Novel means is used for securing the free end of the lever to the chassis. I do away with the platform locking device and the auxiliary arm locking device shown in my copending application. Furthermore the stud openings in the wheel are aligned with the studs on the platform before the wheel is lifted from the ground. The arm is swung for rocking the wheel to align the stud openings with the studs, after which the wheel is secured to the platform.

The device is simple in construction and permits a heavy truck wheel weighing about three hundred pounds to be handled by one man. The only lifting of the auxiliary wheel that is necessary is to swing the lever from a substantially horizontal position in which the platform receives the auxiliary wheel into a vertical position where the platform will be swung into a horizontal position. The placing of the platform off center with respect to the lever causes the weight of the tire to aid in swinging the platform into a horizontal position.

Other objects and advantages will appear in the following specification, and the novel features of the device will be particularly pointed out in the appended claims.

My invention is illustrated in the accompanying drawing forming a part of this application, in which:

Figure 3 is an enlarged side elevation of the device; and

Figure 4 is a section along the line 4—4 of Figure 2 showing the device on the same scale as in Figure 3.

Figure 1:
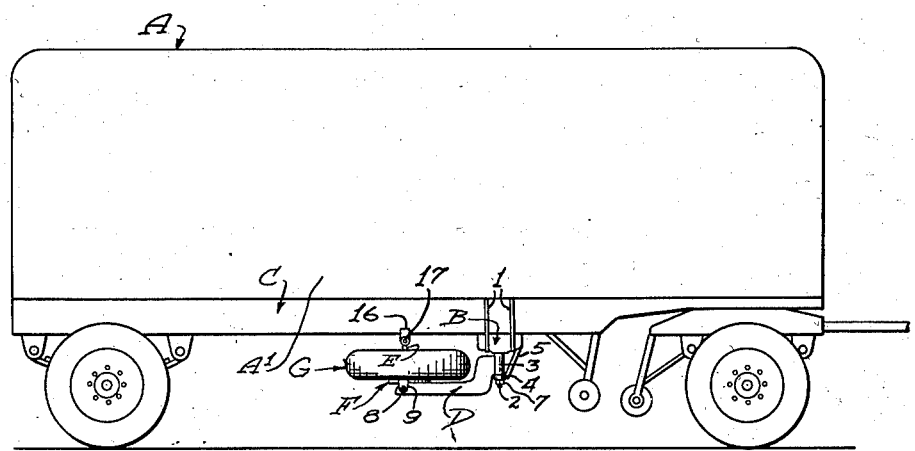
Figure 1 is a side elevation of a trailer showing my device operatively applied thereto.
Figure 2:
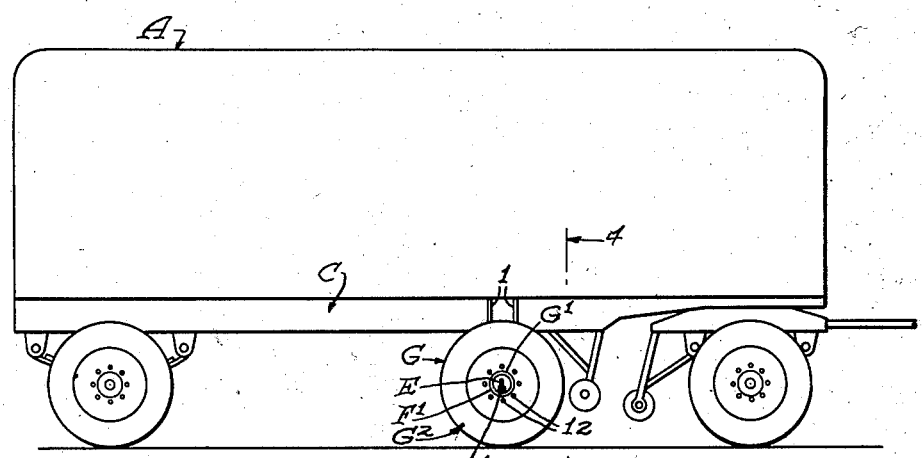
Figure 2 is a view similar to Figure 1 and shows the device in a position to receive an auxiliary wheel and tire.

While I have shown only the preferred form of my invention, it should be understood that various changes or modifications may be made within the scope of the appended claims without departing from the spirit of the invention.

In carrying out my invention I make use of a trailer, indicated generally at A, and this trailer has a saddle B secured to the chassis C by U-bolts 1. The saddle B has an integral downwardly extending shaft 2 on which the bearing 3 of an auxiliary wheel carrying arm D is rotatably mounted. The lower end of the shaft 2 is held against lateral movement by a sleeve 4 that is connected to the saddle B or to a cross beam by two T-shaped (in cross section) struts 5 and 5ª. The sleeve 4 also holds the sleeve against downward movement on the shaft. The two struts are clearly shown in Figure 4, one of the struts being secured to the saddle and the other strut 5a extending at right angles to the chassis C and being secured to a cross beam C1 at 6. A nut 7 is screwed onto the threaded end of the shaft 2 to act as an additional support for the sleeve 4.

The auxiliary wheel carrying arm D is in the shape of an L although I do not wish to be confined to any particular shape. The free end of the arm has a lever E pivotally secured thereto at 8. The lever E is rigidly connected to a platform F and ears 9 extend below the platform and straddle the arm D. The ears have openings for receiving the pivot bolt 8. The lever E and the platform F are swingable as a unit about the pivot 8.

It will be noted from Figure 3 that the platform is mounted off center with respect to the lever E so that the greater portion of the platform will rest on the arm D when the platform is swung into a horizontal position. The platform has a tendency to swing into a horizontal position. The platform has a ring guide F1 for receiving an auxiliary wheel indicated generally at G. The lever E has reinforcing ribs 10 that are integral with the lever and with the platform, these ribs having the additional function of acting as inclined guides for registering the wheel opening with the ring guide as the wheel is moved into place. Studs 11 are carried by the platform and are receivable in stud openings 12 in the wheel G when the latter are aligned with the studs.

The lever E has a threaded eye-shank 13 that is screwed down into a threaded portion in the lever and is locked in adjusted position by a nut 14, see Figure 3. Figure 4 shows the free end of the eye-shank 13 as being provided with an eye 15. The eye 15 registers with an opening in an eye bracket 16 that is secured to the chassis C. A bolt 17 is passed through the aligned openings and secures the platform against swinging accidentally and holds the arm D in inoperative position. The bolt 17 also supports the free end of the arm.

From the foregoing description of the various parts of the device, the operation thereof may be readily understood.

In securing the wheel G to the platform F the arm D is first swung into a position at right angles to the chassis C, see Figure 4. The arm is long enough so as to position the platform F at the side A1 of the truck or trailer. The lever E is now swung into a horizontal position which will swing the platform into a vertical position. The tire and wheel are rolled over the ground 18 into a position where the lever E and guide F1 will pass through the central opening G1 in the auxiliary wheel. If the stud receiving openings 12 on the wheel do not register with the studs 11 on the platform, a simple swinging movement of the arm D will roll the tire on the ground and bring the adjacent openings 12 into registration with the studs 11. Nuts 11a may now secure the wheel to the platform. The swinging of the arm D to align the stud openings with the studs is accomplished by grasping the lever E and swinging the lever and arm horizontally in the desired direction.

After the wheel has been secured to the platform, the lever E is manually swung about the pivot 8 into a vertical position. Very little lifting effort is needed because the pivot 8 is near the center of gravity of the wheel and the greater portion of the platform is on the side of the pivot which will aid in swinging the platform and wheel into a horizontal position. When the wheel and platform are in a horizontal position, the arm D is swung horizontally into a parallel position with the chassis C. This will bring the eye 15 of the lever into registration with the opening in the eye bracket 16. The bolt 17 may now be inserted through the aligned openings, and a nut 17a threaded onto the bolt for securing the lever to the bracket. The device is now locked in inoperative position and the free end of the arm is supported.

When removing the tire from the carrier the reverse operation is followed. First the bolt 17 is removed and then the arm D is swung through an arc of 90°, after which the lever E is swung downwardly to bring the tire G2 into contact with the ground 18. The stud nuts 11a may now be removed and this will free the auxiliary wheel from the platform. Very little effort is needed in taking care of an auxiliary wheel that weighs in the neighborhood of three hundred pounds. The operator need not touch the tire with his hands during the removal of the wheel from the device nor in the securing of the wheel to the device. The lever holds the arm and platform against movement when it is attached to the chassis and supports the free end of the arm.

I claim:

1. An auxiliary wheel and tire carrier comprising an arm pivotally secured to a chassis and swingable in a horizontal plane from a position parallel to the chassis into a position at right angles thereto, said arm having a horizontal portion, a lever pivoted to the free end of the arm, a platform integral with the lever and swingable by the lever from a substantially vertical plane into a horizontal position overlying the horizontal portion of the arm, said platform adapted to receive an auxiliary wheel when in a vertical position and the arm is at right angles to the chassis and while the wheel still rests on the ground, and to support the wheel in a horizontal position when the lever is swung into a vertical position, and means for securing the lever to the chassis when the arm is swung into a parallel position with respect to the chassis.

2. An auxiliary wheel and tire carrier comprising an arm pivotally secured to a chassis and swingable in a horizontal plane from a position parallel to the chassis into a position at right angles thereto, said arm having a horizontal portion, a lever pivoted to the free end of the arm, a platform integral with the lever and swingable by the lever from a substantially vertical plane into a horizontal position overlying the horizontal portion of the arm, said platform adapted to receive an auxiliary wheel when in a vertical position and the arm is at right angles to the chassis and while the wheel still rests on the ground, and to support the wheel in a horizontal position when the lever is swung into a vertical position, and means for securing the lever to the chassis when the arm is swung into a parallel position with respect to the chassis, said means comprising a bracket on the chassis with an opening therein, said lever having an opening adapted to be brought into alignment with the bracket opening, and a bolt passed through the aligned openings for securing the lever to the chassis.

3. In an auxiliary wheel carrier, a pivotal arm, a lever pivoted to the free end of the arm, a platform swingable with the lever, said platform being mounted off center, a wheel guide ring integral with the platform and designed to enter the central wheel opening for mounting the wheel on the platform, the center of the guide ring coinciding with the platform center but being disposed off-center with respect to the lever, and reinforcing ribs for the lever and connected to the platform, said ribs being disposed on the side of the lever positioned nearest the platform center, said ribs being cam-shaped for aiding in guiding the wheel center opening over the guide ring.

4. In an auxiliary wheel carrier, an arm pivoted to a chassis and swingable from a position paralleling the length of the chassis into one extending at right angles to the chassis, a lever pivoted to the arm and swingable from a horizontal position into a vertical position, a tire and wheel carrying platform integral with the lever and being disposed in a vertical position when the lever is in a horizontal position to receive an auxiliary wheel and tire and being swingable into a horizontal position to support the wheel when the lever is swung into a vertical position, and means for securing the free end of the lever to the chassis, said lever acting as a handle for swinging the wheel and platform into a horizontal position when the lever is swung into a vertical position, said lever when secured to the chassis serving the additional functions of holding the arm against swinging and the platform against swinging with respect to the arm and of supporting the free end of the arm.

5. An auxiliary wheel and tire carrier comprising an arm pivotally secured to and beneath a chassis, said arm having a horizontal portion swingable in a horizontal plane, a lever pivoted to the free end of the arm, a platform integral with and extending at right angles to the lever, said platform being swingable by the lever from a substantially vertical plane for receiving a tire into a horizontal position for supporting the tire, said lever extending vertically when the platform is in its latter position, and means for securing the lever to the chassis when the lever extends vertically and the arm is swung for positioning the top of the lever under the chassis.

6. An auxiliary wheel and tire carrier comprising an arm pivotally secured to and beneath a chassis, said arm having a horizontal portion swingable in a horizontal plane, a lever pivoted to the free end of the arm, a platform integral with and having its plane extending at right angles to the lever, said platform being swingable by the lever from a substantially vertical plane for receiving a tire into a horizontal position for supporting the tire, said lever extending vertically when the platform is in its latter position, and means for securing the lever to the chassis when the lever extends vertically and the arm is swung for positioning the top of the lever under the chassis, said means comprising a bracket on the chassis with an opening therein, an adjustable screw-eye carried by the lever and adapted to be brought into alignment with the bracket opening, and a securing member passed through the aligned openings for securing the lever to the chassis.

7. In an auxiliary wheel carrier, a pivotal arm having a horizontally disposed free end swingable from a position under a vehicle into one where the free end will project beyond the side of the vehicle, a lever pivoted to the free end of the arm and swingable from a vertical to a horizontal position, a circular platform extending at right angles to the lever and being mounted eccentrically thereon, a wheel guide ring concentric with the platform and designed to enter the central opening in a wheel for guiding the wheel onto the platform when the plane of the wheel is in a substantially vertical position, and the wheel is still supported by the ground, said lever being manually swingable for swinging the platform and the wheel into a horizontal position to overlie the horizontal end of the arm, the eccentric mounting of the platform on the lever shifting the center of gravity of the platform and wheel to a point where it will aid in this movement.

8. An auxiliary wheel and tire carrier comprising an arm pivotally secured to a chassis and swingable in a horizontal plane from a position paralleling the length of the chassis into one in which the arm will extend at right angles to the chassis, a lever pivoted to the free end of the arm and swingable from a vertical position into a horizontal position where the lever will be extending in the same direction as the arm, a tire supporting platform carried by the lever and extending at right angles thereto, said lever when in a horizontal position and the arm when extending at right angles to the chassis positioning the platform to receive an auxiliary wheel and tire while the wheel is still supported by the ground, the lever projecting through the central opening in the wheel, studs carried by the platform and adapted to register with the stud openings in the wheel when the arm is swung by the lever to rock the wheel and align the openings with the studs, whereby the wheel may be secured to the platform by screwing nuts on the studs, said lever being swingable into its vertical position for swinging the platform and wheel into a horizontal position to be supported by the arm, said arm being swingable into parallel position with the vehicle chassis, and means for securing the free end of the lever to the chassis.

9. An auxiliary wheel and tire carrier comprising an arm pivotally secured to a chassis and swingable in a horizontal plane from a position paralleling the length of the chassis into one in which the arm will extend at right angles to the chassis, a lever pivoted to the free end of the arm and swingable from a vertical position into a horizontal position where the lever will be extending in the same direction as the arm, a tire supporting platform carried by the lever and extending at right angles thereto, said lever when in a horizontal position and the arm when extending at right angles to the chassis positioning the platform to receive an auxiliary wheel and tire while the wheel is still supported by the ground, the lever projecting through the central opening in the wheel, studs carried by the platform and adapted to register with the stud openings in the wheel when the arm is swung by the lever to rock the wheel and align the openings with the studs, whereby the wheel may be secured to the platform by screwing nuts on the studs, said lever being swingable into its vertical position for swinging the platform and wheel into a horizontal position to be supported by the arm, said arm being swingable into parallel position with the vehicle chassis, and means for securing the free end of the lever to the chassis, said platform being secured to the lever at a point off center so that the weight of the wheel will tend to hold the platform in a horizontal position.

KENNETH C. CLARK.